(12) United States Patent
Moreno et al.

(10) Patent No.: US 6,880,570 B2
(45) Date of Patent: Apr. 19, 2005

(54) VEHICLE ACTUATOR

(75) Inventors: Alejandro Moreno, El Paso, TX (US);
Conrado Carrillo, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 56 days.

(21) Appl. No.: 10/641,754

(22) Filed: Aug. 14, 2003

(65) Prior Publication Data

US 2005/0034769 A1 Feb. 17, 2005

(51) Int. Cl.$^7$ ............................................. F15B 13/044
(52) U.S. Cl. ............. 137/596.17; 137/550; 251/129.14
(58) Field of Search ....... 137/550, 596.17; 251/129.14

(56) References Cited

U.S. PATENT DOCUMENTS

| | | | |
|---|---|---|---|
| 4,998,559 A | * | 3/1991 | McAuliffe, Jr. ......... 137/596.17 |
| 5,076,323 A | * | 12/1991 | Schudt ................... 137/596.17 |
| 6,189,519 B1 | | 2/2001 | Press et al. |
| 6,305,758 B1 | | 10/2001 | Hageman et al. |
| 6,460,295 B1 | | 10/2002 | Johnson et al. |
| 6,481,526 B1 | | 11/2002 | Millsap et al. |
| 6,517,089 B1 | | 2/2003 | Phillis et al. |
| 6,547,031 B1 | | 4/2003 | Magnus |
| 6,561,304 B1 | | 5/2003 | Henry |
| 6,578,933 B1 | | 6/2003 | Hageman et al. |
| 6,619,616 B1 | * | 9/2003 | Sudani et al. ........... 251/129.14 |
| 6,719,006 B1 | * | 4/2004 | Fleischer et al. ....... 137/596.17 |
| 2003/0037825 A1 | * | 2/2003 | Runge et al. .......... 137/596.17 |

* cited by examiner

*Primary Examiner*—Gerald A. Michalsky
(74) *Attorney, Agent, or Firm*—Jimmy L. Funke

(57) ABSTRACT

A linear three-port actuation valve for a vehicle has a valve seat member that is engaged with a valve body to a location that establishes a desired poppet stroke. The valve body defines a lower seat and the valve seat member defines an upper seat, and a poppet slides within the member to selectively block the lower seat. When the lower seat is not blocked the upper seat is blocked by a ball positioned against the poppet, and vice-versa. Accordingly, the valve seat member aligns the poppet with the lower seat, it aligns the ball with the upper seat, it directs fluid through the upper seat to a control port, and it establishes the desired stroke of the poppet, reducing the number of components and simplifying assembly.

19 Claims, 1 Drawing Sheet

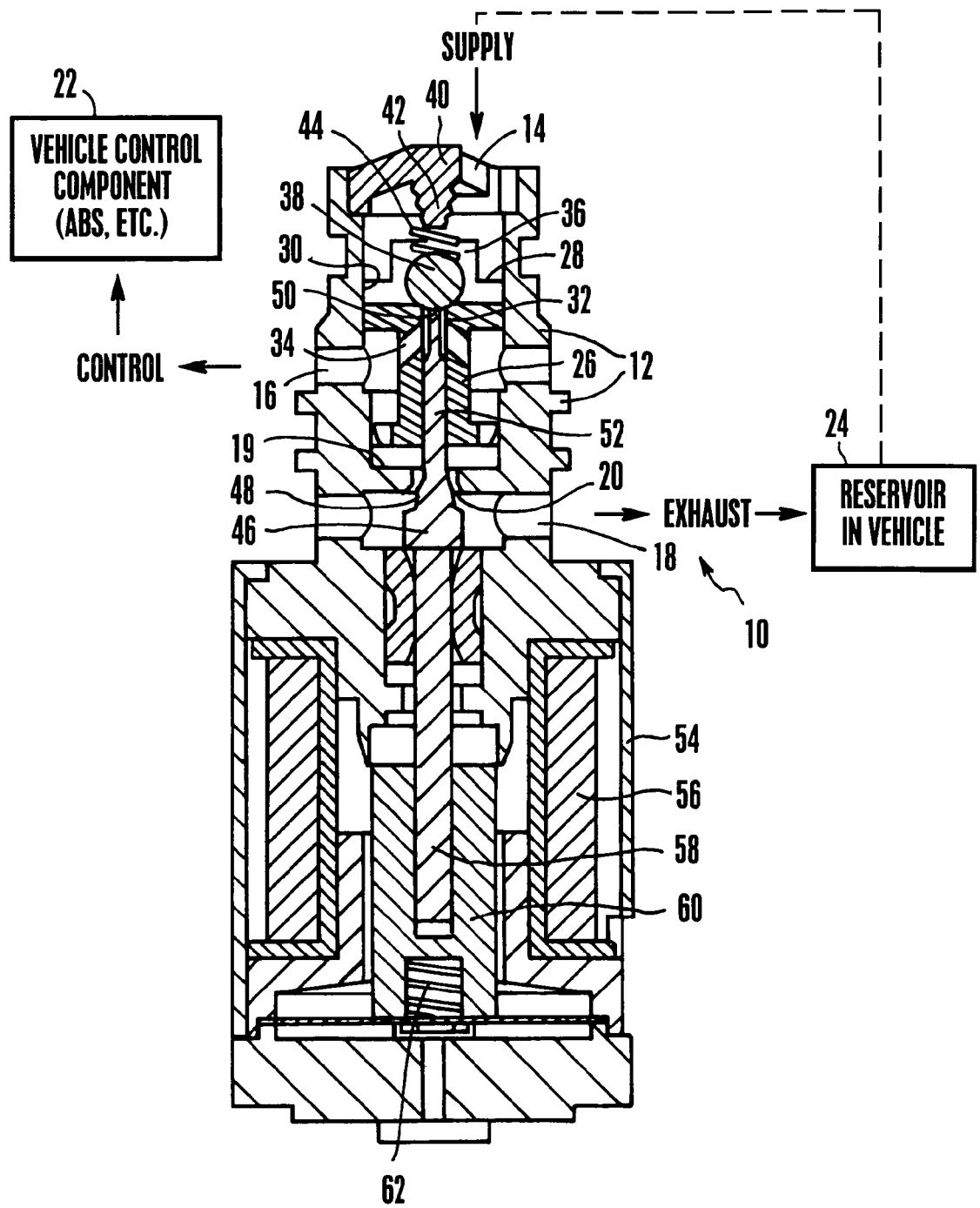
The Figure

VEHICLE ACTUATOR

I. FIELD OF THE INVENTION

The present invention relates generally to vehicle actuators.

II. BACKGROUND OF THE INVENTION

Actuators such as hydraulic valves used in vehicles in anti-lock braking systems (ABS), traction control systems, stability control systems, and other systems typically use electrically-controlled sliding rods to selectively permit or prevent fluid flow through the actuator under particular circumstances, as required for the application.

Many such actuators have three ports, with the valve being controlled to establish fluid communication through any two of the ports as dictated by the operational circumstances. Typically, the ports are referred to as the supply, control, and exhaust ports. Such valves can be used to provide actuation hydraulic pressure to other components in the control system by moving the valve to establish fluid communication between the supply and control ports. The actuation pressure subsequently can be relieved by moving the valve to establish fluid communication between the supply and exhaust ports.

The present invention recognizes that three port actuation valves usually require the use of many components that must move precisely relative to each other with small tolerances. This burdens both manufacturing and assembly costs, and leads to valves that can be complex to make. The present invention further recognizes that it would be desirable to provide a linear actuator valve that uses a reduced number of components compared to existing valves, that facilitates alignment of components that must cooperate with each other, and that are simpler to assemble than existing valves.

SUMMARY OF THE INVENTION

A linear three port actuation valve for a vehicle includes a valve body formed with a supply port, a control port, an exhaust port, and an exhaust valve seat. A valve seat member is in the body, and the valve seat member defines a control valve seat. Also, a poppet defines a head end and a ball end, and the poppet is slidably disposed in the valve seat member for movement between an exhaust configuration, in which the head end is distanced from the exhaust valve seat of the valve body to establish fluid communication from the supply port, through the exhaust valve seat, to the exhaust port, and a control configuration, in which the head end blocks the exhaust valve seat. A ball contacts the ball end of the poppet adjacent the control valve seat of the valve seat member. The ball blocks the control valve seat when the poppet is in the exhaust configuration, and is distanced from the control valve seat when the poppet is in the control configuration to permit fluid communication from the supply port, through the control valve seat, to the control port.

If desired, an orifice can be formed in the valve seat member between the control seat and the control port of the valve body. Also, the valve seat member can be formed with an annular ball retainer above the control seat to prevent lateral movement of the ball.

With this structure, the valve seat member not only defines the control seat, but it also aligns the poppet head end with the exhaust valve seat of the valve body. Moreover, the valve seat member directs fluid from the control seat to the control port. Furthermore, the valve seat member can be advanced into the valve body to a location that establishes a desired poppet stroke. Still further, the valve seat member aligns the ball with the control seat.

In another aspect, an actuator includes a valve body defining supply, control, and exhaust ports and also defining an exhaust seat. A poppet is movable between a control configuration, wherein the exhaust seat is blocked by the poppet, and an exhaust configuration, wherein the exhaust seat is not blocked by the poppet. Unitary means are provided for slidably supporting the poppet in alignment with the exhaust seat, for defining a control seat, for directing fluid flow from the control seat to the control port, and for laterally supporting a ball above the control seat.

In still another aspect, a method for assembling an actuator includes providing a valve body defining supply, control, and exhaust ports and also defining an exhaust seat. The method includes advancing a shaft of a poppet through the exhaust seat until a head of the poppet is juxtaposed with the exhaust seat, and then installing a valve seat member defining a control seat and an orifice extending from the control seat into the valve body over the poppet shaft until the orifice communicates with the control port of the body. The poppet is aligned with the exhaust seat by the valve seat member.

The details of the present invention, both as to its structure and operation, can best be understood in reference to the accompanying drawings, in which like reference numerals refer to like parts, and in which:

BRIEF DESCRIPTION OF THE DRAWINGS

The FIGURE is an elevational cross-sectional view of the present actuator in the exhaust configuration, showing associated vehicle components schematically.

DETAILED DESCRIPTION OF THE PREFERRED EMBODIMENT

Now referring to the FIGURE, an actuator 10 includes a rigid metal or plastic hollow valve body 12 defining a supply port 14, a control port 16, and an exhaust port 18. The body 12 is also formed with a lower annular flange 19 that defines an interior exhaust valve seat 20. As shown in the FIGURE, the control port 16 may be in fluid communication with a component 22 of a vehicle control system, such as but not limited to an ABS system, a traction control system, a stability control system, or other system. The supply port 14 may receive fluid from a reservoir 24 in the vehicle in which the actuator 10 is located or from some other source, and the exhaust port 18 may exhaust fluid to the reservoir 24 or to some other component.

As shown in the FIGURE, a hollow rigid metal or plastic valve seat member 26 is positioned within the valve body 12. More particularly, the valve seat member 26 includes an upper flange 28 that engages the bore 30 of the valve body 12 in an interference fit, such that the valve seat member 26 can be engaged with the valve body 12 (by, e.g., a press fit or slip fit with a stake) and held in the location to which it is advanced solely by cooperation of the flange 28 and valve body 12 without the need for further fasteners or engagement methods. In a preferred embodiment the valve seat member 26 is a single unitary piece of plastic or metal.

A hollow control seat 32 is formed in the upper flange 28 of the valve seat member 26. Like the exhaust seat 20 formed by the valve body 12, the control seat 32 formed by the valve seat member 26 may be frusto-conical in shape. An orifice 34 is formed in the valve seat member 26 and the orifice 34 communicates with the control seat 32 and with the control port 16, such that when the control seat 32 is not blocked, fluid may flow through the control seat 32, orifice 34, and out of the control port 16.

Above the control seat 32, the valve seat member 26 forms an annular ball retainer 36 in which a ball 38 may reciprocate along the long axis of the actuator 10 to selectively block the control seat 32. The ball retainer 36 prevents lateral motion of the ball 38, such that the ball 38 is aligned with the control seat 32 by the valve seat member 26.

A filter 40 can be installed in the open top end of the valve body 12 as shown. The filter 40 can be slip fit with a stake into the open top end, or it can be press fit, or otherwise engaged with the valve body 12. The filter 40 may be any filter suitable for removing particles from the fluid entering the actuator 10 through the supply port 14. A frusto-conical spring retainer 42 protrudes from the filter 40 into the valve body 12 as shown, with a coil spring 44 being snappingly engaged with the retainer 42 to contact the ball 38 and urge the ball 38 toward the control seat 32.

A poppet 46 defining an upward-oriented (looking down on the FIGURE) head end seat element 48, a ball end 50, and a shaft 52 therebetween is slidably centrally disposed in the hollow valve seat member 26. The shaft 52 of the poppet 46 is closely received in the valve seat member 26 as shown, so that the valve seat member 26 aligns the poppet 26 with the exhaust valve seat 20 by preventing lateral motion of the shaft 52.

The head end seat element 48 is formed complementarily to the exhaust seat 20 of the valve body 12, and the ball end 50 is in contact with the ball 38. The poppet can move up and down within the valve seat member 26 between an exhaust configuration, in which the head end seat element 48 is distanced from the exhaust valve seat 20 to establish fluid communication from the supply port 14 through the exhaust valve seat 20 to the exhaust port 18, and a control configuration, in which the head end seat element 48 mates with the exhaust valve seat 20 to block fluid flow through the seat 20. Under influence of the spring 44, the ball 38 mates with the control valve seat 32 to block the seat 32 when the poppet 46 is in the exhaust configuration. On the other hand, when the poppet 46 is in the control configuration the ball 38 is pushed away from the control valve seat 32 by the poppet 46 to permit fluid communication from the supply port 14 through the control valve seat 32 and orifice 34, to the control port 16.

In assembling the valve portion of the actuator 10, the poppet 46 may be slid upwardly through the exhaust port 20 of the valve body 12 until the head end 48 is adjacent the exhaust port 20 as shown. Then, the ball 38 may be positioned onto the control port 32 of the valve seat member 26 and the valve seat member 26 advanced into the valve body 12 with the shaft 52 of the poppet 46 being received in the valve seat member 26. The valve seat member 26 is advanced into the valve body 12 until a desired poppet stroke is established. Stated differently, the valve seat member 26 is engaged with the valve body 12 to a location that establishes a desired location of travel of the poppet 46. The valve seat member may be, e.g., press fitted or slip fitted with a stake into the valve body 12. Then, the spring 44 may be snapped onto the retainer 42 of the filter 40 and the filter 40 then press fit or otherwise advanced into the valve body 12, compressing the spring 44 against the ball 38.

With this structure, a single unitary valve seat member of the present invention aligns the poppet with the exhaust seat, it establishes the stroke of the poppet, it aligns the ball with the control seat, and it establishes fluid communication between the control seat and the control port of the body. Only five valving components—the valve body, the valve seat element, the poppet, the ball, and the spring—are required to establish the linear three port actuator of the present invention.

Although not central to the inventive valving components discussed above, the FIGURE also shows structure for actuating the poppet 46. A can 54 can be engaged with the valve body 12 opposite the filter 40, and a coil 56 is disposed in the can 54. The coil 56 is electromagnetically coupled to a plunger 58 through a ferromagnetic sleeve 60 to move the sleeve 60 with plunger 58 within the can 54 when the coil 56 is energized and deenergized by control signals from, e.g., an engine control module (ECM) of a vehicle. The plunger 58 abuts the poppet 46 as shown, so that when the plunger 58 moves the poppet 46 also moves. A spring 62 can be provided to bias the sleeve 60 upward relative to the FIGURE and, hence, to bias the actuator 10 to the control configuration when the coil 56 is deenergized. When the coil 56 is energized the actuator 10 is moved to the exhaust configuration.

While the particular VEHICLE ACTUATOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A linear three port actuation valve for a vehicle, comprising:

a valve body formed with a supply port, a control port, an exhaust port, and an exhaust valve seat;

a valve seat member in the body, the valve seat member defining a control valve seat;

a poppet defining a head end and a ball end, the poppet being slidably disposed in the valve seat member for movement between an exhaust configuration, in which the head end is distanced from the exhaust valve seat to establish fluid communication from the supply port, through the exhaust valve seat, to the exhaust port, and a control configuration, in which the head end blocks the exhaust valve seat;

a ball contacting the ball end of the poppet adjacent the control valve seat, the ball blocking the control valve seat when the poppet is in the exhaust configuration, the ball being distanced from the control valve seat when the poppet is in the control configuration to permit fluid communication from the supply port, through the control valve seat, to the control port.

2. The valve of claim 1, further comprising a spring disposed between the ball and a filter in the valve body to urge the ball against the ball end of the poppet.

3. The valve of claim 1, wherein the valve seat member aligns the poppet head end with the exhaust valve seat.

4. The valve of claim 1, wherein the valve seat member is formed with a ball retainer to align the ball with the control seat.

5. The valve of claim 1, wherein the valve seat member is formed with an orifice between the control valve seat and the control port to establish a pathway for fluid communication therebetween.

6. The valve of claim 1, wherein the valve seat member is press fit into the valve body to a location that establishes a desired location of travel of the poppet.

7. The valve of claim 1, wherein at least the control port is in fluid communication with a vehicle control system component.

8. The valve of claim 1, wherein the valve seat member consists of a single unitary piece.

9. An actuator comprising:
a valve body defining supply, control, and exhaust ports and also defining an exhaust seat;
a poppet movable between a control configuration, wherein the exhaust seat is blocked by the poppet, and an exhaust configuration, wherein the exhaust seat is not blocked by the poppet; and
unitary means for slidably supporting the poppet in alignment with the exhaust seat, for defining a control seat, for directing fluid flow from the control seat to the control port, and for laterally supporting a ball above the control seat.

10. The actuator of claim 9, wherein the unitary means is a valve seat member.

11. The actuator of claim 10, further comprising a spring disposed between the ball and a filter in the valve body to urge the ball against a ball end of the poppet.

12. The actuator of claim 10, wherein the valve seat member aligns a poppet head end with the exhaust valve seat.

13. The actuator of claim 10, wherein the valve seat member is formed with an orifice between the control valve seat and the control port to establish a pathway for fluid communication therebetween.

14. The actuator of claim 10, wherein the valve seat member is press fit into the valve body to a location that establishes a desired location of travel of the poppet.

15. The actuator of claim 11, wherein the spring snappingly engages the filter, and the filter is press fit into the valve body.

16. The actuator of claim 10, wherein at least the control port is in fluid communication with a vehicle control system component.

17. A method for assembling an actuator, comprising:
providing a valve body defining supply, control, and exhaust ports and also defining an exhaust seat;
advancing a shaft of a poppet through the exhaust seat until a head of the poppet is juxtaposed with the exhaust seat;
providing a valve seat member defining a control seat and an orifice extending from the control seat;
pressing the valve seat member into the valve body over the poppet shaft until the orifice communicates with the control port of the body, the poppet being aligned with the exhaust seat by the valve seat member; and
advancing the valve seat member in the valve body to a location that establishes a desired location of travel of the poppet.

18. The method of claim 17, further comprising:
providing a ball on the control seat prior to pressing the valve seat member into the body; and
establishing contact between the ball and shaft of the poppet during the pressing act.

19. The method of claim 18, further comprising:
providing a filter;
snapping a spring onto the filter; and
pressing the filter into the valve body to compress the spring against the ball.

* * * * *